Figure 1:
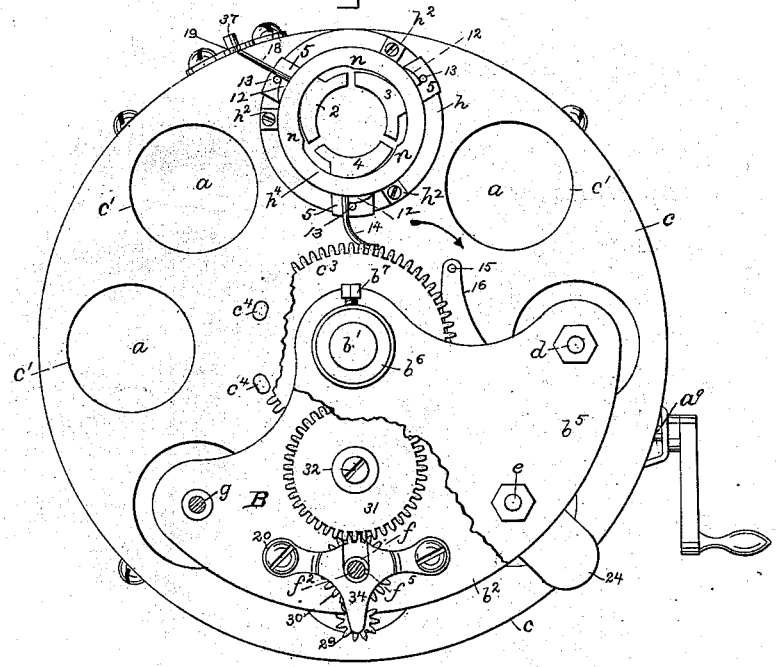

(Model.)

G. H. PIERCE.
Mechanism for Placing and Soldering Heads in Cans.

No. 235,700. Patented Dec. 21, 1880.

Witnesses:
C. D. Dearborn.
N. E. Whitney.

Inventor:
George H. Pierce.
by Crosby & Gregory
Attys.

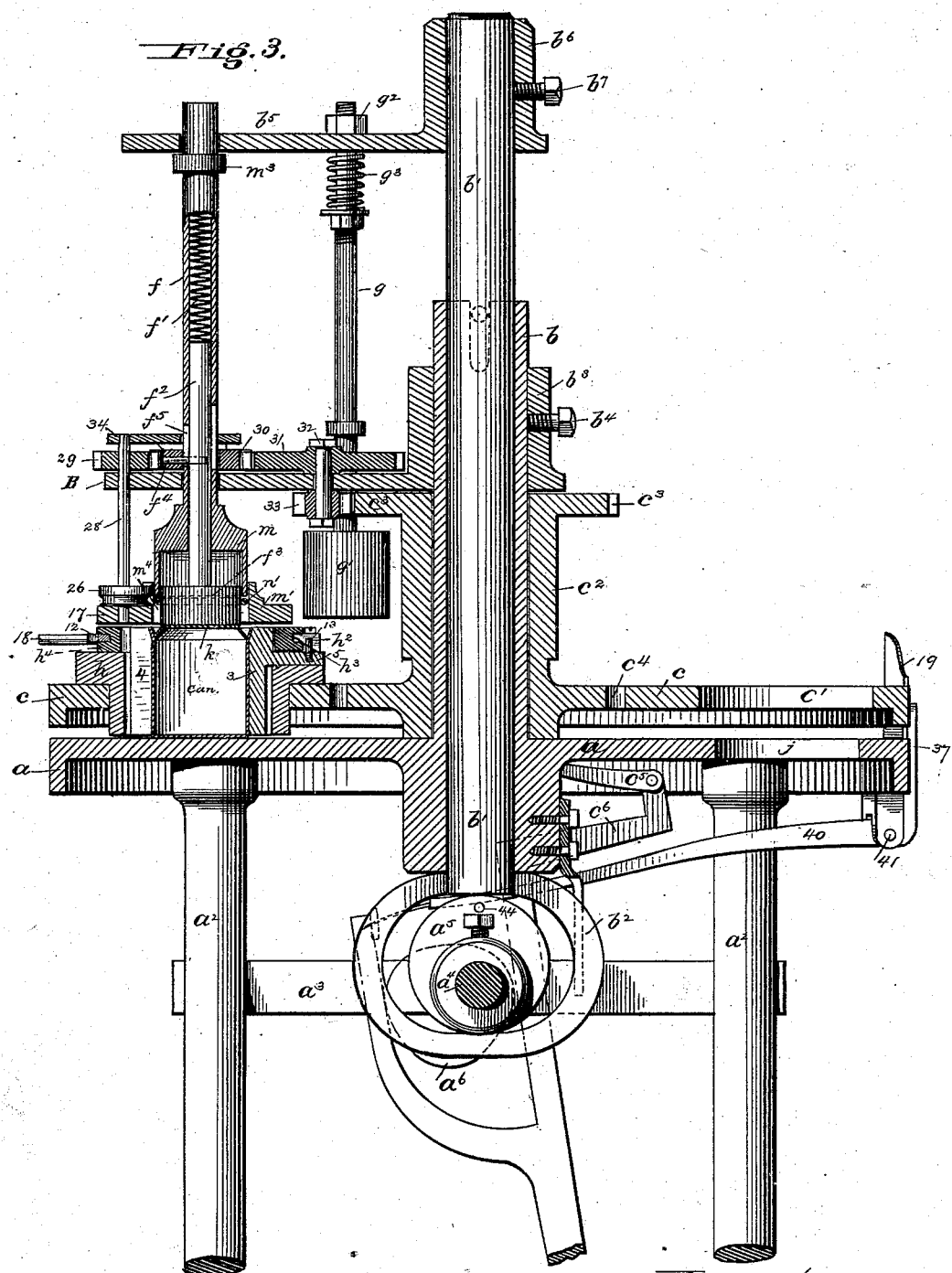

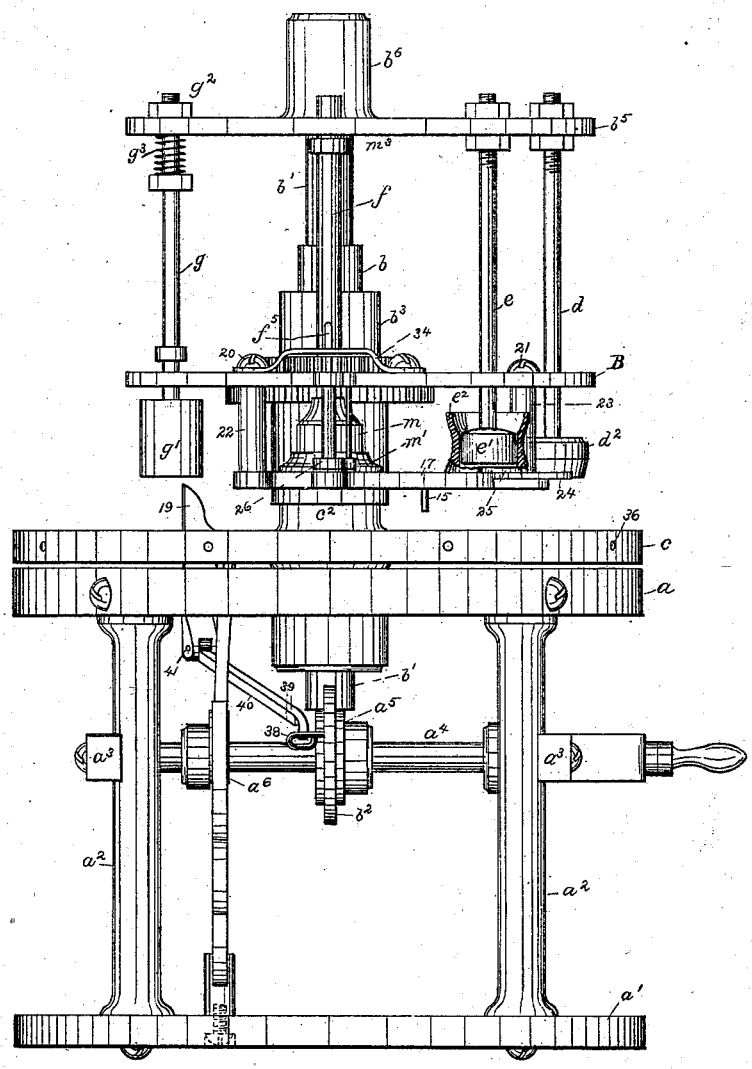

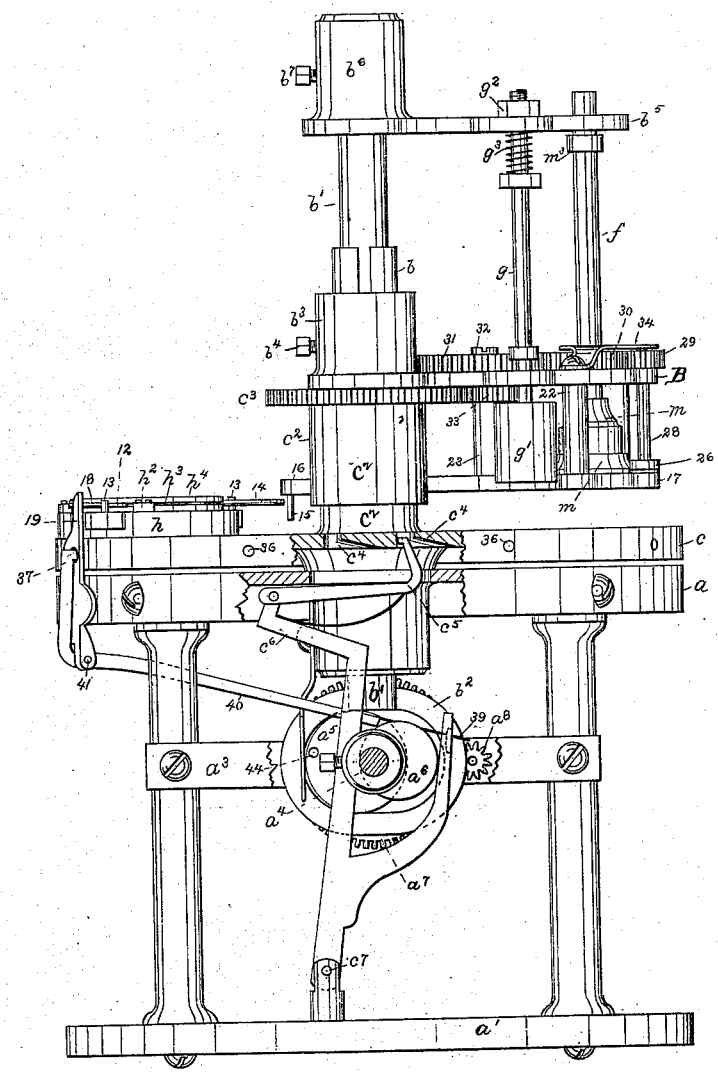

(Model.) 5 Sheets—Sheet 5.

G. H. PIERCE.

Mechanism for Placing and Soldering Heads in Cans.

No. 235,700. Patented Dec. 21, 1880.

WITNESSES
V. D. Dearborn
N. E. Whitney

INVENTOR
George H. Pierce
by Crosby & Gregory
Atty

UNITED STATES PATENT OFFICE.

GEORGE H. PIERCE, OF RICHMOND, QUEBEC, CANADA, ASSIGNOR OF FIVE-EIGHTHS TO CHARLES E. BUTTERS AND WILLIAM N. CONNER, OF BOSTON, AND ROYAL T. WADLEIGH, OF NEWTONVILLE, MASSACHUSETTS.

MECHANISM FOR PLACING AND SOLDERING HEADS IN CANS.

SPECIFICATION forming part of Letters Patent No. 235,700, dated December 21, 1880.

Application filed August 13, 1880. (Model.)

*To all whom it may concern:*

Be it known that I, GEORGE H. PIERCE, of Richmond, Province of Quebec, Canada, have invented an Improvement in Mechanisms for Placing and Soldering Heads in Cans, of which the following description, in connection with the accompanying drawings, is a specification.

This invention relates to a can heading and soldering machine.

In this apparatus the can-body, suitably soldered together at its side, is placed within a clamp held in an automatically-operated intermittingly rotated or movable table, and so held a can-expander is caused to descend within the open end of the can and expand or curve it outwardly, shaping it properly for the easy entrance therein of the can-head to be inserted therein. The can-head is inserted laterally within a cup or cylinder, which serves to hold it in position under a plunger that descends upon the said head and depresses it into the expanded end of the can-body. This plunger is inclosed by, and at the proper time is reciprocated vertically within, the cup or cylinder referred to, and in said cup is placed a quantity of pulverized rosin. This plunger is of such shape that at each descent a small annular space is left between it and its surrounding cylinder, sufficient to permit the discharge from the cylinder upon the can-head of a suitable quantity of rosin. The next motion of the movable table carries the can-body, with the head placed in it, as described, below a circular core, and about which the solder-wire is bent to form an annulus or ring to just fit between the inclined outer edge of the can-head and the inside of the body, as in Fig. 9. In connection with this core is a set of feeding-rollers, to feed the solder-wire into the annular space between the said core and its inclosing-jacket, and as the solder-wire is bent into ring form the ejector surrounding the core is depressed to sever the ring from the length of wire held between the feed-rollers and supplied from a suitable reel or spool, the said ejector in its downward motion also acting to discharge the ring of solder-wire directly in place upon the can-head, as described. At the next movement of the table the can, with the said solder-wire ring in the position described, is acted upon by cylindrical solder-bolt heated by gas or otherwise, that melts the solder-wire and secures the head in the can-body. During a subsequent movement of the table an arm connected with the cam-ring which holds the sectors or jaws of the clamp in position upon the can-body is acted upon to release the sectors or jaws from the can-body, when the can with a head soldered in it is permitted to drop from the said clamp down through a suitable opening in a bed below the table. The can having been discharged from the open clamp, another can-body is inserted therein, and as the table is further moved another arm upon the clamp-closing cam-ring strikes a closing projection and closes the clamp upon the can-body, holding it firmly in position until again released, as just described, the said body during the time that it is so held having applied to it, as before described, a can-head. This intermittingly-movable table will contain a series of, preferably eight, clamps, each one of which will contain a can-body, and all the devices before stated as operating to expand the end of the can, insert the head, place upon it the soldering-ring, and melt the ring to solder the head will operate simultaneously upon four cans, each device performing its particular duty.

My invention consists in the special construction and several combinations of mechanism for effecting these operations and results, as hereinafter more fully set forth and claimed.

Figure 2:
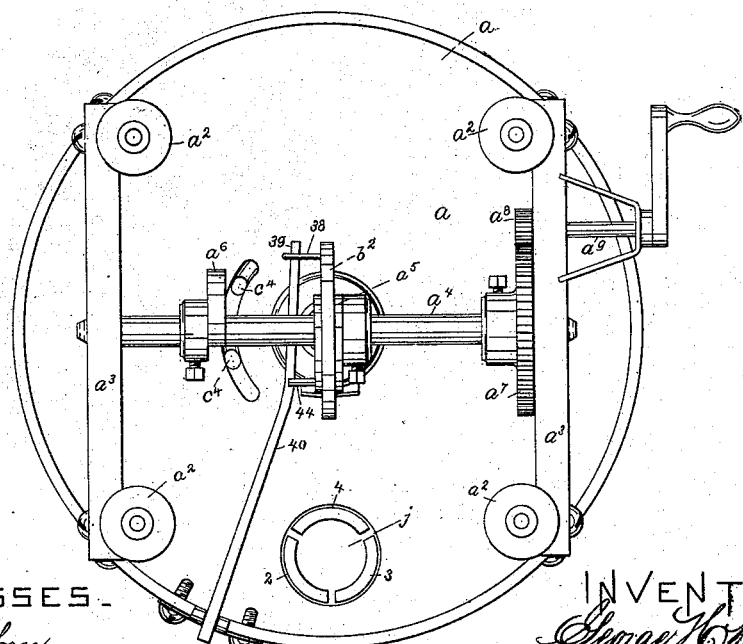
Figure 5:
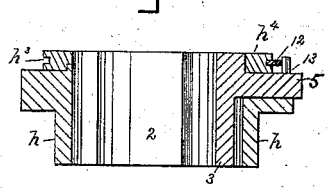
Figure 6:
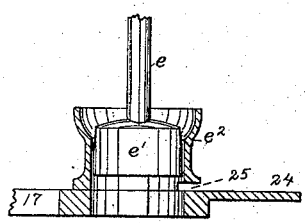
Figure 7:
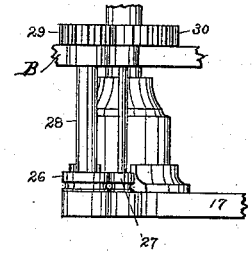
Figure 8:
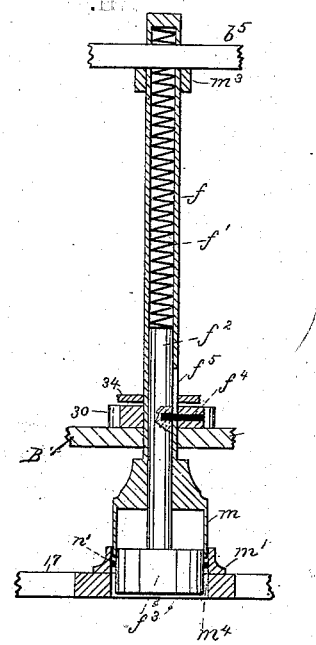
Figure 9:
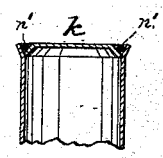
Figure 10:
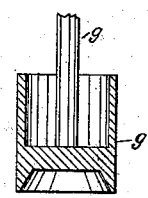

Figure 1 represents, in top view, a head-soldering mechanism embodying my invention, a part of the frame-work being broken away to more clearly illustrate some of the working parts, the clamp (one only being shown to avoid confusion of the drawings) being opened to receive the can-body. Fig. 2 is an under-side view of the machine, the bottom plate, $a'$, and pawl $c^5$ and its actuating-lever being removed. Fig. 3 is an enlarged central vertical cross-section of my machine, the clamp being in position under the solder-depositing devices. Fig. 3$^a$ is a front elevation of the machine, the clamp not being shown, as it is in that figure supposed to be at the rear of the machine, the rosin-holding cup or cylinder being in cross-section. Fig. 4 is a left-hand side elevation of Fig. 3, part of the frame-work being broken away and the main shaft being cut off; Fig. 5, a detail showing, in vertical section, a clamp for a can-body; Fig. 6, a detail of the contrivance for holding the head of the can, the said figure showing the plunger arranged within the rosin-holding cup or cylinder; Fig. 7, an enlarged detail, showing a front elevation of the feeding device for the solder-wire and the apparatus for forcing it into an annulus or ring; Fig. 8, a sectional detail of the plungers and devices for depositing the solder-wire on the can. Fig. 9 represents, in section, the upper end of a can-body having a head placed within it, with the solder-wire ring in place; and Fig. 10 is a section of the solder-bolt.

The main frame-work of the machine is composed of annular plates $a\ a'$, united by suitable standards $a^2$, to which are secured the cross-bars or bearings $a^3$, that support the main shaft $a^4$, having upon it two cams, $a^5\ a^6$, and a toothed gear, $a^7$. This shaft $a^4$, as herein shown, derives its movement of rotation from a pinion, $a^8$, on a shaft, $a^9$, driven in any usual way, preferably by power through suitable belts and pulleys. (Not shown.)

The upper plate, $a$, of the frame-work has projecting upward from it a tubular stem, $b$, or sleeve, to receive a lifting-rod, $b'$, having at its lower end a yoke, $b^2$, that surrounds the cam $a^5$, the said cam, by its action upon the yoke, reciprocating the said lifting-rod once after each intermitting movement of the table $c$.

A plate, B, having a hub, $b^3$, is connected by a screw, $b^4$, with the sleeve $b$ near its upper end. This plate B serves to guide the rods $d\ e\ f\ g$, to be hereinafter referred to.

A plate, $b^5$, of like shape with B, and having a hub, $b^6$, is connected by a screw, $b^7$, with the upper end of the lifting-rod $b'$, the said plate receiving the upper ends of the rods $d\ e\ f\ g$, some of which, as hereinafter described, are fixed upon the said plate $b^5$, and some of which move in holes made in the said plate.

The movable table or bed $c$, having made in it a suitable number of openings, $c'$, and having a hollow hub, $c^2$, upon which is fixed a tooth-gear, $c^3$, is placed above the upper plate, $a$, so that the hub $c^2$ is made to surround the tubular sleeve $b$ loosely. This intermittingly-movable table $c$ is provided, as herein shown, with a series of ratchet-teeth or holes, $c^4$, (see Fig. 4,) and the said teeth are engaged by a pawl, $c^5$, at the upper end of the lever $c^6$, pivoted at $c^7$, and moved intermittingly by the cam $a^6$, before described. The said lever and pawl give to the movable table $c$ an intermitting or step-by-step movement, sufficient to carry a clamp contained in one of the holes $c'$ far enough to place the said clamp in succession below the different devices which are to operate successively upon the can-body and its head during the operation of soldering the can-head in the can-body.

The clamp referred to is composed (see Figs. 1, 2, and 5) of three movable sectors, 2 3 4, the shanks 5 of which are guided in radial grooves in a collar, $h$. The neck of the collar $h$ is placed within one of the openings $c'$ of the movable bed $c$, where it is suitably secured. On this collar $h$ is a cam-ring, $h^4$. This cam-ring is held in place upon the collar $h$ by means of gibs $h^2$, the ends of which enter an annular groove, $h^3$, (see Figs. 3 and 5,) at the outside of the said cam-ring. This cam-ring has suitable cam-projections $n\ n\ n$ on its inner face, to act upon and move the sectors inwardly, so as to contract them upon the outside of the can-body which is placed between them; and upon the outside of the said cam-ring are projections 12, to act upon pins 13 of the shanks of the sectors to move the sectors outwardly or withdraw them to release the can-body at the proper time.

When the mechanism is in the position shown in Fig. 1 the sectors of the clamp are open to receive a can-body, and as the movable table is turned forward in the direction of the arrow, Fig. 1, the arm or projection 14 of the cam-ring will strike the pin 15, held in the extension 16 of a plate, 17, Figs. 1, 3, and 4, to be hereinafter described, which will so turn the cam-ring of the clamp contrivance as to cause it to force the sectors inwardly and clamp or hold the can-body. The can-body will be held clamped in this way until in the rotation of the table the clamp is brought in such position that the arm 18 of the cam-ring will strike the releasing-projection 19, when the cam-ring will be so moved as to cause its projections 12 to move the sectors and release the can-body held between them, it in the meantime having had a head soldered thereon.

In the position shown in Fig. 1 the clamp is directly above an opening, $j$, (see Fig. 2,) in the upper plate, $a$, of the frame-work, the said opening permitting the can at that time to be discharged through the bottom of the clamp and the said opening $j$ simply by its own gravity.

The rod $d$ has its upper end secured to the plate $b^5$, and at its lower end is provided with the conical expander or spreader $d^2$, the function of which is to enter the open end of a can-body held in position below it by the clamp and expand or bevel outwardly the open end of the can-body, as shown in Fig. 9, to receive within it the head $k$, which has been suitably flanged and beveled, as in Fig. 9, in some other proper machine.

The expander having been thrust down into the can-body for the proper distance is raised therefrom as the plate $b^5$ and lifting-rod $b'$ are elevated, and the table $c$ is moved forward one step, thus placing the can-body so expanded in position directly below the plunger $e'$, connected with the rod $e$, also firmly attached at its upper end to the plate $b^5$, the said plunger being located within the annular cup $e^2$, which is to contain pulverized rosin. (See Fig. 6.) This rosin-holding cup or cylinder $e^2$ is supported upon the plate 17, before referred to, it being suspended from the plate B by means of screws 20 21, that enter posts 22 23, forming part of the plate 17. This plate 17 has a shelf, 24, upon which is placed the can-head $k$, and the latter is inserted into position below the plunger $e'$ and within the cup $e^2$ or cylinder through a slot, 25, (see Fig. 6,) therein after the can-cylinder has been brought into position under it. The can-head, being light and filling the interior of the cup $e^2$ snugly, is supported therein frictionally; but should the friction between the flanged part of the head and cup not be sufficient to hold up the head, then the head would simply drop or settle a short distance upon the expanded top of the can preparatory to its being sealed evenly and closely on the said can-body by the plunger $e'$. As the plunger $e'$ descends it strikes the upper side of the can-head then held in the path of its descent, and depresses the said can-head into the expanded end of the can-body. The plunger $e'$ is so tapered and so placed in the cup $e^2$ that as the plunger reaches its lowest position sufficient space is left between its periphery and the inner side of the said cup $e^2$ to permit the powdered rosin contained therein to fall or be deposited about and upon the upper side of the can-head near the can-body. As the plunger $e'$ is elevated it fully closes or stops up the opening at the bottom of the cup $e^2$, thus checking the descent of the rosin. Now the movable table $c$ is again moved another step, placing the rosined can head and body in position immediately below the devices which are to feed forward the solder-wire and form it into a ring and cut it off and deposit the ring upon the can-head. This solder-wire-feeding mechanism is composed of two grooved rollers, 26 and 27, roughened or scored, the better to engage the solder-wire. The feed-roller 26 is fixed upon a shaft, 28, having a pinion, 29, which meshes in a pinion, 30, driven by the toothed gear 31 on a stud, 32, at the lower end of which there is a small pinion, 33, which derives its movement of rotation intermittingly from the gear $c^3$ on the hub $c^2$ of the bed $c$, before described. The feed-roller 27 merely serves the purpose of a surface against which the solder-wire may be pressed while being fed.

The device for forming the solder wire into a ring and for cutting it off will now be described.

The shaft $f$, before referred to, is made as a tube, (see Fig. 8,) within which is a spiral spring, $f'$, and its foot rests upon a rod, $f^2$, projected upward from the circular core $f^3$. The rod $f^2$ has a pin, $f^4$, (see Fig. 8,) which is extended through a slot, $f^5$, in the tube $f$, and thence into the pinion 30, which is seated upon the plate B, and held down by the cross-piece 34. By this connection the rod $f^2$ cannot rise or fall, but will be rotated intermittingly, together with the core $f^3$, just once for each intermitting movement of the table $c$, the pin $f^4$ in the slot $f^5$ also rotating the shaft $f$ and its attached solder-wire-ring ejecter $m$. (Shown as a hollow or cylindrical head fitted to embrace the core $f^3$ and enter between it and the annular casing $m'$, supported on the plate 17.)

The spring $f'$ within the rod $f$ acts to keep the collar $m^3$ pressed upward against the plate $b^5$ and the ring-ejector $m$ elevated in the position shown in Fig. 8, in which position the solder-wire is fed through an opening in the casing $m'$, by the feeding-rollers, into the annular spaces $m^4$ between the core $f^3$ and the annular casing $m'$, the core $f^3$ at the same time being rotated by the pinion 30, to assist in carrying the solder-wire $n'$ (shown in the said figure by the black dots) around the said core, so as to form the solder-wire into an annulus or ring. As soon as the said ring is formed the plate $b^5$ is depressed, as before described, causing the ring-ejector $m$ to descend into the spaces $m^4$, act upon the wire $n'$, cut it off, and deposit the ring held in the said annular space $m^4$ upon the can-head, as represented in Fig. 9 by the letter $n'$, after which the plate $b^5$ is elevated and the ring-ejector is lifted by the spring $f'$. The table $c$ is now again moved forward another step, placing the can body and head, with rosin upon it and provided with the solder-wire ring, in position under the solder-bolt, a sectional detail of which is shown in Fig. 10.

The solder-bolt $g'$ may be of any usual shape and be heated in any usual way by gas or gasoline, and is attached to the rod $g$, the upper end of which is extended loosely through the plate $b^5$, and has attached to it a nut, $g^2$, to permit the plate $b^5$ to lift the rod and solder-bolt for the proper distance to enable it to descend upon and retire from the solder-wire and can-head.

The extent or degree of pressure of the solder-bolt upon the can-head may be varied by expanding or contracting the spring $g^3$, placed upon the rod $g$, the said spring being pressed upon and compressed more or less during the descent of the plate $b^5$ after the lower end of the solder-bolt $g'$ touches the solder-ring.

In some instances I may desire to partially rotate the solder-bolt $g'$. I have not in the drawings shown devices for that purpose, but a simple way would be to provide the gear 31 at its top with a grooved hub or pulley to receive a belt, which would extend about a corresponding pulley feathered on the shaft or rod $g$.

The can-body, having been held securely in the clamp during all the time that its head was operated upon by the devices just described, is now to be released from the clamp, as it will be, by the arrival of the arm 15 in contact with the releasing-projection 19.

The table $c$, in its periphery, is provided with a series of holes, 36, in which, as the table is permitted to rest after the action of the pawl $c^5$, the catch 37 (see Fig. 4) enters and holds the table positively at rest until the proper time arrives to again move it forward, when the said catch is released by the pin 44 on the cam $a^5$.

The yoke $b^2$ is provided with a loop, 38, into which is entered a spring, 39, attached to the arm 40 of the catch 37, the said arm being pivoted at 41 upon an extension, as herein shown, of the projection 19. As the arm 40 is lifted by the pin 44 the spring 39 is bent or flexed, and as the said pin passes from below the said spring the latter moves quickly to turn the catch and lock the table c in place.

I claim—

1. In a machine to solder can-heads into can-bodies, an intermittingly-movable table and a series of clamps for the can-body, combined with an expander to enter and expand the ends of the can-bodies held in the said clamps and presented automatically below the said expander, and with means to operate the said parts, substantially as described.

2. In a machine to solder can-heads into can-bodies, the intermittingly-movable table and one or more can-holding clamps, and with means to operate the table and clamps, combined with the rosin-holding cup or cylinder to hold the can-head, and with the movable plunger within the said cup to act upon and deposit the can-head in the end of the can-body, the movement of the plunger permitting the discharge of rosin on the can-head, as and for the purpose described.

3. In a machine to solder can-heads into can-bodies, the movable table, one or more clamps to hold the can-bodies, the expander to expand the end of the can-bodies in succession, the cylinder to hold can-heads, and a plunger to depress the said heads singly into the expanded end of the can-body, combined with means to operate the expander and plunger, substantially as described.

4. In a machine to solder can-heads into can-bodies, the core $f^3$, the annular casing about it, and feeding-rollers for the wire-solder, combined with means to operate the core and rollers to form the wire-solder into a ring, as set forth.

5. In a machine to solder heads into can-bodies, the core $f^3$, the annular casing about it, feeding mechanism to feed the wire-solder into the annular space between the core and casing to form it into a ring, and the ring-ejector to remove the said ring from the core, combined with means to operate the core and ring-ejector, substantially as described.

6. In a machine to solder can-heads into can-bodies, the intermittingly-rotating table and one or more can-body clamps, the core and feeding-rollers to feed the solder-wire forward and form it into an annulus or ring about the core, and with the ring-ejector to cut the solder-wire and place the solder-ring in position upon the head, combined with means to operate the said devices, substantially as described.

7. In a machine to solder heads into can-bodies, an intermittingly-rotating table, one or more clamps thereon to hold the can-bodies, the cylinder to hold the can-head, the plunger to act upon and place the can-head in the can-body, the annular casing, the core therein, and feeding mechanism or devices to feed forward the solder-wire, form it into a ring, cut it off, and deposit it upon the can-head, combined with means to move the clamps, plunger, feeding device, and core, substantially as described.

8. In a machine to solder can-heads into can-bodies, an intermittingly-movable table and one or more clamps thereon to hold the can-bodies, a cylinder to hold the can-head, a plunger to act upon and push the can-head down into the can-body, and a vertically-movable solder-bolt to act upon solder placed upon the can-head and melt the same, combined with means to operate the said moving parts, substantially as described.

9. In a machine to solder heads of cans into can-bodies, the following instrumentalities, viz: an intermittingly-operated table, a series of clamps mounted thereon to hold the can-bodies, an expander to expand the open end of the can-body, a cylinder to hold a can-head, a plunger to cause the head to be inserted or placed in the body, feeding mechanism to intermittingly move forward the solder-wire, a core to assist in forcing the said wire into a ring or annulus, an ejector to cut off the wire and remove it from the core in position upon the can-head, and a solder-bolt to melt the said solder-wire, and means to automatically operate the said parts, substantially as and for the purpose set forth.

10. The can-holding clamp composed of the collar $h$ and radially-movable sectors 2 3 4, their pins or projections 13, the cam-ring $h^4$, and its projections 12, combined with means to operate them, whereby the can-body is released or held, substantially as described.

11. The rotating core $f^3$, feeding-rollers for the solder-wire, and an annular casing, $m'$, combined with the reciprocating ejector $m$, to sever the solder-wire and discharge the solder-wire ring from the core, substantially as described.

12. The rosin-holding cup or cylinder $e^2$ and the plunger within it, as described, and means to reciprocate the plunger and place it in such position as to permit the discharge of rosin from the cylinder about the lower end of the plunger, as and for the purpose described.

13. The plate 17, provided with the shelf 24, and the cylinder having the side slot, 25, for the entrance of the can-head therein, combined with the plunger located within the said cylinder, and means to operate it and cause it to descend upon the said head and remove it from the said cylinder into a can-body, substantially as described.

In testimony whereof I have signed my name to this specification in the presence of two subscribing witnesses.

GEORGE H. PIERCE.

Witnesses:
C. P. CLEVELAND,
A. J. BREADON.